United States Patent
Liberg et al.

(10) Patent No.: US 12,526,039 B2
(45) Date of Patent: Jan. 13, 2026

(54) RELIABLE LINK PERFORMANCE FOR CELLULAR INTERNET OF THINGS AND NEW RADIO IN NON-TERRESTRIAL NETWORKS

(71) Applicant: Telefonaktiebolaget LM Ericsson (publ), Stockholm (SE)

(72) Inventors: Olof Liberg, Enskede (SE); Helka-Liina Määttanen, Helsinki (FI); Siva Muruganathan, Stittsville (CA); Henrik Rydén, Solna (SE); Xingqin Lin, Santa Clara, CA (US); Stefan Eriksson Löwenmark, Färentuna (SE); Jonas Sedin, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1125 days.

(21) Appl. No.: 17/429,752

(22) PCT Filed: Feb. 10, 2020

(86) PCT No.: PCT/IB2020/051035
§ 371 (c)(1),
(2) Date: Aug. 10, 2021

(87) PCT Pub. No.: WO2020/165736
PCT Pub. Date: Aug. 20, 2020

(65) Prior Publication Data
US 2022/0131602 A1 Apr. 28, 2022

Related U.S. Application Data

(60) Provisional application No. 62/803,900, filed on Feb. 11, 2019.

(51) Int. Cl.
*H04W 72/23* (2023.01)
*H04B 7/06* (2006.01)
*H04B 7/185* (2006.01)

(52) U.S. Cl.
CPC ..... *H04B 7/18528* (2013.01); *H04B 7/06952* (2023.05); *H04W 72/23* (2023.01)

(58) Field of Classification Search
CPC  H04W 72/23; H04B 7/18528; H04B 7/06952
(Continued)

(56) References Cited

U.S. PATENT DOCUMENTS

| 2018/0343653 A1 | 11/2018 | Guo | |
| 2020/0280422 A1* | 9/2020 | Wong | H04L 5/0091 |
| 2021/0084640 A1* | 3/2021 | Kang | H04B 7/0404 |

FOREIGN PATENT DOCUMENTS

| CN | 102714579 A | 10/2012 |
| CN | 104754624 A | 7/2015 |

(Continued)

OTHER PUBLICATIONS

International Search Report and Written Opinion dated Apr. 30, 2020 issued in PCT Application PCT/IB2020/051035, consisting of 15 pages.
(Continued)

*Primary Examiner* — Chuck Huynh
(74) *Attorney, Agent, or Firm* — Weisberg I.P. Law, P.A.

(57) ABSTRACT

A method, network node and wireless device for reliable link performance for cellular Internet of things (IoT) and New Radio (NR) in non-terrestrial networks. In some embodiments, a network node configured to operate in a cellular non-terrestrial network is provided. The network node includes processing circuitry configured to provide an indication of transmission property information associated with a reconfiguration of precoding weights where the indication
(Continued)

BEGIN

Provide an indication of transmission property information associated with a reconfiguration of precoding weights, the indication of transmission property information providing information associated with decoding a physical downlink shared channel or physical downlink control channel S138

END of transmission property information provides information associated with decoding a physical downlink shared channel or physical downlink control channel.

13 Claims, 10 Drawing Sheets

(58) Field of Classification Search
USPC .......................................................... 370/316
See application file for complete search history.

(56) References Cited

FOREIGN PATENT DOCUMENTS

| CN | 107409008 A | 11/2017 |
|---|---|---|
| WO | 2018/083253 A1 | 5/2018 |
| WO | 2018/232090 A1 | 12/2018 |

OTHER PUBLICATIONS

Qualcomm Incorporated, 3GPP TSG RAN WG1 Meeting AH 1801; R-11800867; Title: "Remaining Details on QCL"; Agenda Item: 7.2.3.7; Document for: Discussion/Decision; Vancouver, Canada, Jan. 22-26, 2018, consisting of 8 bages.

3GPP TS 36.211 V15.0.0 (Dec. 2017) 3rd Generation Partnership Project; Technical Specification Group Radio Access Network (E-UTRA); Physical Channels and Modulation (Release 15), consisting of 219 pages.

3GPP TR 38.811 V15.0.0 (Jun. 2018) 3rd Generation Partnership Project; Technical Specification Group Radio Access Network; Study on New Radio (NR) to Support Non-Terrestrial Networks (Release 15), consisting of 118 pages.

3GPP TS 38.331 V15.0.0 (Dec. 2017) 3rd Generation Partnership Project; Technical Specification Group Radio Access Network NR; Radio Resource Control (RRC) Protocol Specification (Release 15), consisting of 188 pages.

3GPP TS 36.331 V15.0.0 (Dec. 2017) 3rd Generation Partnership Project; Technical Specification Group Radio Access Network; Evolved Universal Terrestrial Radio Access (E-UTRA); Radio Resource Control (RRC); Protocol Specification (Release 15), consisting of 776 pages.

3GPP TS 51.021 V15.1.0 (Sep. 2018) 3rd Generation Partnership Project; Technical Specification Group Radio Access Network; Base Station System (BSS) Equipment Specification; Radio Aspects (Release 15), consisting of 248 pages.

Chinese Office Action and English Summary translation of the Chinese Office Action dated May 23, 2024 issued in corresponding Chinese Application No. 202080013836.9, consisting of 21 pages.

Chinese Office Action and English language Summary translation of the Chinese Office Action dated Oct. 27, 2023 issued in corresponding Chinese Application No. 202080013836.9, consisting of 16 pages.

* cited by examiner

RELIABLE LINK PERFORMANCE FOR CELLULAR INTERNET OF THINGS AND NEW RADIO IN NON-TERRESTRIAL NETWORKS

CROSS-REFERENCE TO RELATED APPLICATIONS

This application is a Submission Under 35 U.S.C. § 371 for U.S. National Stage Patent Application of International Application No.: PCT/IB2020/051035, filed Feb. 10, 2020 entitled "RELIABLE LINK PERFORMANCE FOR CELLULAR INTERNET OF THINGS AND NEW RADIO IN NON-TERRESTRIAL NETWORKS," which claims priority to U.S. Provisional Application No.: 62/803,900, filed Feb. 11, 2019, entitled "RELIABLE LINK PERFORMANCE FOR CELLULAR INTERNET OF THINGS AND NEW RADIO IN NON-TERRESTRIAL NETWORKS," the entireties of both of which are incorporated herein by reference.

TECHNICAL FIELD

The present disclosure relates to wireless communications, and in particular, to reliable link performance for cellular Internet of things (IoT) and New Radio (NR) in non-terrestrial networks.

BACKGROUND

Cellular Internet of Things (IoT)
In Release 13 of the Third Generation Partnership Project (3GPP), Extended Coverage Global System for Mobile communications (EC-GSM) Internet of Things (IoT) and Narrow Band (NB) IoT with support for Long Term Evolution (LTE) bandwidth reduced low complexity (BL) wireless devices (WDs) operating in coverage enhanced (CE) modes A and B are specified. The LTE BL/CE mode operation is hereafter referred to as LTE-M operation. NB-IoT and LTE-M are designed to provide qualities such as deep indoor coverage, high system capacity and long device battery life.

In Release 1.1 of the Multefire Alliance (MFA), unlicensed versions of LTE-M and NB-IoT for operation in a non-terrestrial network (NTN) are specified.
Extended Coverage (EC)

EC-GSM-IoT, NB IoT, LTE M and other radio access technologies use time repetitions of radio blocks for improving coverage and reliability. NB-IoT, for example, in an extreme case, supports up to 2048 consecutive time repetitions of the narrowband physical downlink shared channel (NPDSCH). In the 3GPP and MFA specifications, this concept is referred to as 'blind repetitions' or just 'repetitions'. This type of repetition is transmitted without awaiting feedback from the receiving node, which describes why the concept in some cases is referred to as blind repetitions.

The use of time repetitions is supported both in the uplink (UL), e.g., from the wireless device to the network node, and the downlink (DL), e.g., from the network node to the wireless device, for offering a symmetric performance improvement.

The receiving node can assume that the transmitting node for any given antenna port provides a coherent waveform that allows the receiver to differentiate the channel over which a symbol on the antenna port is conveyed from the channel over which another symbol on the same antenna port is conveyed. This means that the transmitter presents to the receiver a well-defined time and frequency reference meeting tight requirements for maintaining a constant amplitude, a constant reference frequency and a continuous phase trajectory.

Equation 1 below illustrates an example of a signal s(t) that meets the coherency requirements because of its time-invariant amplitude A, carrier frequency fc and phase $\rho_c$:

$$s(t)=A\cdot\sin(2\pi f_c t+\rho_c) \qquad (\text{Eq 1})$$

In addition, the 3GPP/MFA base band specifications provide for each repeated radio block a well-defined starting point to and length T in time, and a specified starting phase $\rho_o$.

3GPP Technical Standard (TS) 51.021, section 6.3, specifies a test case and requirement for verifying the ability of an EC-GSM-IoT base station to provide a waveform with coherent phase and coherent amplitude. The test case requires the base station to generate four repeated radio blocks for which the transmitted complex IQ representations are combined. The measured power gain of the combined waveform relative to the power of the first of the repeated blocks should not be less than 10 dB. This can be compared to an ideal power gain over 4 repetitions, each with amplitude A, of 10 log $10((A+A+A+A)^2/A^2)$=12 dB.

At the receiver, the repeated blocks are typically combined to improve the receiver processing gain. The well specified transmitter requirements allow the receiver to adapt, and optimize, the receiver combining method. The optimal combining scheme is typically dependent on the radio technology. In case of EC-GSM-IoT, a popular scheme is to accumulate the received complex IQ representation of each radio block in a set of repeated blocks. This allows the receiver to achieve a sufficient signal-to-noise (SNR) ratio before performing time synchronization, channel estimation, and demodulation. In case of NB-IoT and LTE-M, a popular combining method is to jointly estimate the radio channel for a set of consecutive radio blocks. This allows the receiver to improve the channel estimate and optimize the coherent demodulation performance across a set of repeated radio blocks.

If the above-mentioned transmitter requirements are not assumed to be fulfilled, the receiving node reverts to a less efficient combining method. In the case of EC-GSM-IoT, the receiver performs soft-bit combination instead of IQ level combination. In case of NB-IoT and LTE-M, the receiver performs channel estimation on a per received radio block basis.
New Radio (NR)

In 3GPP Release 15, fifth generation (5G) also referred to as New Radio (NR) was developed. This is the next generation radio access technology which is intended to serve use cases that include enhanced mobile broadband (eMBB), ultra-reliable and low latency communication (URLLC) and massive machine type communications (mMTC).

5G is based on the New Radio (NR) access stratum interface and the 5G Core Network (5GC). The NR physical and higher layers reuse parts of the LTE specification, and to that adds components to support operation in a set of new frequency bands in the frequency range of 24.25 to 52.6 MHz. In 3GPP specifications, this frequency range is referred to a Frequency Range 2 (FR2), while the range below 6 GHz is known as Frequency Range 1 (FR1).

To overcome the challenging propagation conditions in FR2, NR supports advanced beamforming techniques. Concepts in the overall NR operation and its beamforming technology are the concepts of quasi co-location (QCL) and transmission configuration indication (TCI), which are discussed below. QCL was originally introduced for LTE and is evolved in the NR specifications.

Quasi Co-Location (QCL)

To enable the receiver to differentiate the channel over which a symbol on the antenna port is conveyed from the channel over which another symbol on a possibly different antenna port is conveyed, a WD may assume two or more antenna ports are quasi co-located (QCL). Generally, several signals can be transmitted from the same base station physical antenna from different antenna ports. These signals may share the same large-scale properties, for instance in terms of Doppler shift/spread, average delay spread, or average delay. These antenna ports are then said to be quasi co-located (QCL).

The network/network node can signal to the WD that two antenna ports are QCL. If the WD knows that two antenna ports are QCL with respect to a certain parameter (e.g. Doppler spread), the WD can estimate that parameter based on one of the antenna ports and use that estimate when receiving a signal on the other antenna port. Typically, the first antenna port is represented by a measurement reference signal (RS) such as channel state information (CSI)-RS (known as source RS) and the second antenna port is a demodulation reference signal (DMRS) (known as target RS).

For instance, if antenna ports A and B are QCL with respect to average delay spread, the WD can estimate the average delay spread from the signal received from antenna port A (known as the source reference signal (RS)) and assume that the signal received from antenna port B (target RS) has the same average delay. This is useful for demodulation since the WD can know beforehand the properties of the channel when trying to measure the channel utilizing the DMRS.

In LTE, a WD configured in transmission mode 1-9 for a serving cell may assume the antenna ports 0-3, 5, and 7-46 of the serving cell are quasi co-located with respect to Doppler shift, Doppler spread, average delay, and delay spread of the channel. This is referred to as QCL type A in LTE.

Transmission Configuration Indication (TCI)

In NR, the above QCL concepts have been further generalized by introducing transmission configuration indication (TCI) states. For example, the WD can be configured with a list of TCI-State configurations for physical downlink shared channel (PDSCH) decoding. Each TCI-State contains parameters for configuring a QCL relationship between 1 or 2 downlink RSs (qcl-Type1 for the first downlink RS and qcl-Type2 for the second downlink RS, if configured) and the DMRS ports of the PDSCH. The two QCL types, qcl-Type1 and qcl-Type2 are not the same, even when the 2 downlink RSs reference the same downlink (DL) RS.

There are 4 QCL types defined in NR:
'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial receive (Rx) parameter}

QCL-TypeA in NR is similar to the QCL Type A assumption in LTE. QCL-TypeB or QCL-TypeC includes a subset of channel statistical properties from those included in QCL-TypeA. One distinct feature of NR is the operation in high frequency ranges such as millimeter wave, which requires highly directional beamformed transmission and reception. QCL-TypeD is introduced to facilitate beamforming operation in NR. Specifically, QCL-TypeD corresponds to the receive beam information at the WD side. If DMRS of the Physical Downlink Shared Channel (PDSCH) is quasi co-located with an RS with QCL-TypeD, the WD may use the same spatial Rx beamforming parameter used for receiving the RS for receiving the PDSCH.

To introduce dynamics in beam and transmission point (TRP) selection, the WD can be configured through radio resource control (RRC) signaling with N TCI states, where N is up to 128 in frequency range 2 (FR2) and up to 8 in FR1, depending on WD capability.

Each TCI state may contain QCL information, i.e., one or two source downlink reference signals, each source RS associated with a QCL type. For example, a TCI state contains a pair of reference signals, each associated with a QCL type. For example, two different CSI-RSs {CSI-RS1, CSI-RS2} are configured in the TCI state as {qcl-Type1, qcl-Type2}={Type A, Type D}. This means that the WD can derive Doppler shift, Doppler spread, average delay, delay spread from CSI-RS1 and Spatial Rx parameter (i.e., the RX beam to use) from CSI-RS2. In case type D (spatial information) is not applicable, such as in low or midband operation, then a TCI state contains only a single source RS.

Each of the N states in the list of TCI states can be interpreted as a list of N possible beams transmitted from the network or a list of N possible transmission reception points (TRPs) used by the network to communicate with the WD.

A first list of available TCI states is configured for the physical downlink shared channel (PDSCH), and a second list for the physical downlink control channel (PDCCH) contains pointers, known as TCI State IDs, to a subset of the TCI states configured for the PDSCH. The network then activates one TCI state for PDCCH (i.e., provides a TCI for the PDCCH) and up to eight active TCI states for the PDSCH. The number of active TCI states the WD supports is a WD capability but the maximum is 8.

Each configured TCI state contains parameters for the quasi co-location associations between source reference signals (CSI-RS or synchronization signal/physical broadcast channel (SS/PBCH)) and target reference signals (e.g., PDSCH/PDCCH DMRS ports). TCI states are also used to convey QCL information for the reception of CSI-RS.

Assume a WD is configured with 4 active TCI states (from a list of totally 64 configured TCI states). Hence, 60 TCI states are inactive and the WD does not need to be prepared to have large scale parameters estimated for those. But the WD continuously tracks and updates the large scale parameters for the 4 active TCI states by measurements and analysis of the source RSs indicated by each TCI state.

When TCI states have not been configured or activated, the WD may assume that the DMRS ports of the PDSCH of a serving cell are quasi co-located with the SS/PBCH block determined in the initial access procedure with respect to 'QCL-TypeA', and when applicable, also with respect to 'QCL-TypeD'.

In non-terrestrial networks (NTN), the airborne stations (high-altitude platform stations) or spaceborne stations (satellites) may need to update the transmit (Tx) beamforming vectors over time. For example, in a low earth orbit (LEO) satellite communication system with earth fixed beams, different Tx beamforming vectors need to be applied to a spotbeam so that the same geographical area can be covered when the LEO satellite moves.

Non-Terrestrial Networks (NTN)

In 3GPP Release 15, a study item titled "NR to support Non-Terrestrial Networks" was completed which resulted in Technical Report (TR) 38.811. In 3GPP Release 16, the work to prepare NR for operation in an NTN continues, for example, with the study item "Solutions for NR to support Non-Terrestrial Network".

A satellite radio access network usually includes the following components:
- A satellite that refers to a space-borne platform;
- An earth-based gateway that connects the satellite to a base station or a core network, depending on the choice of architecture;
- A feeder link that refers to the link between a gateway and a satellite; and
- A service link that refers to the link between a satellite and a WD.

Two popular architectures are the Bent pipe transponder and the Regenerative transponder architectures. In the first case, the base station is located on earth behind the gateway, and the satellite operates as a repeater forwarding the feeder link signal to the service link, and vice versa. In the second case the satellite is in the base station and the service link connects it to the earth-based core network.

Depending on the orbit altitude, a satellite may be categorized as low Earth orbit (LEO), medium Earth orbit (MEO), or geostationary (GEO) satellite.
- LEO: typical heights ranging from 250-1,500 km, with orbital periods ranging from 90-130 minutes;
- MEO: typical heights ranging from 5,000-25,000 km, with orbital periods ranging from 2-14 hours; and
- GEO: height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spot beam. The footprint of a beam may move over the earth surface with the satellite movement or may be earth fixed with some beam pointing mechanism used by the satellite to compensate for its motion. The size of a spot beam depends on the system design, which may range from tens of kilometers to a few thousands of kilometers. FIG. 1 shows an example architecture of a satellite network with bent pipe transponders.

A transmitting node transmitting a repeated radio block may not be able to deliver the desired stable and coherent waveform expected by a receiving node because:
1. Low cost IoT devices may be equipped with a lost cost frequency reference, also known as a local oscillator. In the most basic implementation, a local oscillator is free running (i.e., non temperature controlled) with the frequency and phase references drifting, and jittering, in time.
2. In transmitters making use of advanced beamforming schemes, the reconfiguration of the precoding weights steering the direction of a beam may create a phase and/or amplitude discontinuity in a transmitted signal. In a NR based NTN with mobile satellite transmitters this may be an unavoidable consequence of providing earth-fixed spot beams.
3. In case of multi-carrier transmitters, it may be desired to induce a random starting phase on each transmitted radio block to reduce the correlation between multiplexed carriers to reduce the peak to average power ratio of the combined waveform.

Examples like these may undermine the ability of a receiving node to perform efficient combining of the received repeated instances of a signal. A phase discontinuity as described in the 2nd example may, e.g., in the worst case of a 180 degrees phase jump, completely cancel out the received signal after combining.

In case of NTN, the $2^{nd}$ example may also challenge the ability to maintain a configured TCI state over time. This may deteriorate the beam selection in a NR based NTN network.

SUMMARY

Some embodiments may advantageously provide methods, network nodes and wireless devices for reliable link performance for cellular Internet of things (IoT) and New Radio (NR) in non-terrestrial networks. In some embodiments, a network node or satellite generates transmission property information, the transmission property information configuring the WD to avoid combining received radio blocks during a time at which a coherent waveform is not available from the network node and/or a time at which a beam switch is to occur. The network node or satellite transmits the transmission property information to the WD.

According to one aspect, the transmitting node indicates its ability to maintain a coherent and stable transmission and a NR TCI state over time to the receiving node. The receiving node may use this information to adapt its receiver algorithm and NR beam selection to optimize its performance.

One or more embodiments described herein supports a reliable receiver implementation, such as for time repetition-based transmission schemes or for beam selection in a NR based NTN. This may optimize the receiver performance and support reliable link level performance as compared with other solutions.

According to one aspect of the disclosure, a network node configured to operate in a cellular non-terrestrial network. The network node includes processing circuitry configured to provide an indication of transmission property information associated with a reconfiguration of precoding weights where the indication of transmission property information provides information associated with decoding a physical downlink shared channel or physical downlink control channel.

According to one or more embodiments of the disclosure, the indication of transmission property information corresponds to a transmission configuration indication, TCI, that indicates a TCI state to implement after the reconfiguration of precoding weights. According to one or more embodiments of the disclosure, the indication of transmission property information indicates a plurality of TCI state configurations. According to one or more embodiments of the disclosure, the indication of transmission property information is transmitted via radio resource control, RRC, signaling, and where the processing circuitry is further configured to cause activation, via medium access control, MAC, control element, CE, signaling, of one of the plurality of TCI states before the reconfiguration of precoding weights.

According to one or more embodiments of the disclosure, the indication of transmission property information is transmitted via RRC signaling, and where the processing circuitry is further configured to cause transmission of a downlink control information, DCI, for activation of one of the plurality of TCI states before the reconfiguration of precoding weights. According to one or more embodiments of the disclosure, the processing circuitry is further configured to configure a time gap between a time slot in which downlink control information, DCI, is transmitted and a time slot where the reconfiguration of precoding weights occurs. According to one or more embodiments of the disclosure, the processing circuitry is further configured to configure a time gap between a time slot in which a PDSCH transmission is configured to start and a time slot where the reconfiguration of precoding weights occurs.

According to one or more embodiments of the disclosure, the processing circuitry is further configured to cause transmission of signaling indicating a time period during which at least one of a phase shift and time shift of a signal discontinuity will occur. According to one or more embodiments of the disclosure, the indication of transmission property information provides an indication of a time period during which one of a coherency of a transmitted waveform will be broken and coherency of a transmitted waveform is expected to be unstable. According to one or more embodiments of the disclosure, the indication of transmission property information provides an indication of a time period during which coherency of a transmitted waveform is expected to be stable. According to one or more embodiments of the disclosure, the processing circuitry is further configured to provide a criteria for defining a stable signal before providing the indication of transmission property information. According to one or more embodiments of the disclosure, the reconfiguration of precoding weights creates a phase and amplitude discontinuity in a transmitted signal.

According to another aspect of the disclosure, a method implemented in a network node that is configured to operate in a cellular non-terrestrial network is provided. An indication of transmission property information associated with a reconfiguration of precoding weights is provided. The indication of transmission property information providing information associated with decoding a physical downlink shared channel or physical downlink control channel.

According to one or more embodiments of the disclosure, the indication of transmission property information corresponds to a transmission configuration indication, TCI, that indicates a TCI state to implement after the reconfiguration of precoding weights. According to one or more embodiments of the disclosure, the indication of transmission property information indicates a plurality of TCI state configurations. According to one or more embodiments of the disclosure, the indication of transmission property information is transmitted via radio resource control, RRC, signaling, and where the processing circuitry is further configured to cause activation, via medium access control, MAC, control element, CE, signaling, of one of the plurality of TCI states before the reconfiguration of precoding weights.

According to one or more embodiments of the disclosure, the indication of transmission property information is transmitted via radio resource control, RRC, signaling, and where the processing circuitry is further configured to cause transmission of a downlink control information, DCI, for activation of one of the plurality of TCI states before the reconfiguration of precoding weights. According to one or more embodiments of the disclosure, a time gap between a time slot in which downlink control information, DCI, is transmitted and a time slot where the reconfiguration of precoding weights occurs is configured. According to one or more embodiments of the disclosure, a time gap between a time slot in which a PDSCH transmission is configured to start and a time slot where the reconfiguration of precoding weights occurs is configured.

According to one or more embodiments of the disclosure, the processing circuitry is further configured to cause transmission of signaling indicating a time period during which at least one of a phase shift and time shift of a signal discontinuity will occur. According to one or more embodiments of the disclosure, the indication of transmission property information provides an indication of a time period during which one of a coherency of a transmitted waveform will be broken and coherency of a transmitted waveform is expected to be unstable. According to one or more embodiments of the disclosure, the indication of transmission property information provides an indication of a time period during which coherency of a transmitted waveform is expected to be stable. According to one or more embodiments of the disclosure, the processing circuitry is further configured to provide a criteria for defining a stable signal before providing the indication of transmission property information. According to one or more embodiments of the disclosure, the reconfiguration of precoding weights creates a phase and amplitude discontinuity in a transmitted signal.

According to another aspect of the disclosure, a wireless device configured to operate in a cellular non-terrestrial network is provided. The wireless device includes processing circuitry configured to: receive an indication of transmission property information associated with a reconfiguration of precoding weights, and operate based at least in part on the indication of transmission property information where the indication of transmission property information provides information associated with decoding a physical downlink shared channel or physical downlink control channel.

According to one or more embodiments of the disclosure, the indication of transmission property information corresponds to a transmission configuration indication, TCI, that indicates a TCI state to implement after the reconfiguration of precoding weights. According to one or more embodiments of the disclosure, the indication of transmission property information indicates a plurality of TCI state configurations. According to one or more embodiments of the disclosure, the indication of transmission property information is transmitted via RRC signaling, and where the processing circuitry is further configured to activate one of the plurality of TCI states before the reconfiguration of precoding weights based at least in part on medium access control, MAC, signaling.

According to one or more embodiments of the disclosure, the indication of transmission property information is transmitted via radio resource control, RRC, signaling, and the processing circuitry is further configured to activate one of the plurality of TCI states before the reconfiguration of precoding weights based at least in part on a downlink control information, DCI, for activation. According to one or more embodiments of the disclosure, the processing circuitry is further configured to operate according to a time gap between a time slot in which downlink control information, DCI, is transmitted and a time slot where the reconfiguration of precoding weights occurs. According to one or more embodiments of the disclosure, the processing circuitry is further configured to operate according to a time gap between a time slot in which a PDSCH transmission is configured to start and a time slot where the reconfiguration of precoding weights occurs.

According to one or more embodiments of the disclosure, the processing circuitry is further configured to receive transmission of signaling that indicates a time period during which at least one of a phase shift and time shift of a signal discontinuity will occur. According to one or more embodiments of the disclosure, the indication of transmission property information provides an indication of a time period during which one of a coherency of a transmitted waveform will be broken and coherency of a transmitted waveform is expected to be unstable. According to one or more embodiments of the disclosure, the indication of transmission property information provides an indication of a time period during which coherency of a transmitted waveform is expected to be stable.

According to one or more embodiments of the disclosure, the processing circuitry is further configured to receive a criteria for defining a stable signal before providing the indication of transmission property information. According to one or more embodiments of the disclosure, the reconfiguration of precoding weights creates a phase and amplitude discontinuity in a transmitted signal.

According to another aspect of the disclosure, a method implemented by a wireless device that is configured to operate in a cellular non-terrestrial network is provided. An indication of transmission property information associated with a reconfiguration of precoding weights is received. Operation based at least in part on the indication of transmission property information is performed where the indication of transmission property information provides information associated with decoding a physical downlink shared channel or physical downlink control channel.

According to one or more embodiments of the disclosure, the indication of transmission property information corresponds to a transmission configuration indication, TCI, that indicates a TCI state to implement after the reconfiguration of precoding weights. According to one or more embodiments of the disclosure, the indication of transmission property information indicates a plurality of TCI state configurations. According to one or more embodiments of the disclosure, the indication of transmission property information is transmitted via radio resource control, RRC, signaling. One of the plurality of TCI states is activated before the reconfiguration of precoding weights based at least in part on medium access control, MAC, signaling.

According to one or more embodiments of the disclosure, the indication of transmission property information is transmitted via radio resource control, RRC, signaling. One of the plurality of TCI states is activated before the reconfiguration of precoding weights based at least in part on a downlink control information, DCI, for activation. According to one or more embodiments of the disclosure, operation according to a time gap between a time slot in which downlink control information, DCI, is transmitted and a time slot where the reconfiguration of precoding weights occurs is performed. According to one or more embodiments of the disclosure, operation according to a time gap between a time slot in which a PDSCH transmission is configured to start and a time slot where the reconfiguration of precoding weights occurs is performed.

According to one or more embodiments of the disclosure, transmission of signaling that indicates a time period during which at least one of a phase shift and time shift of a signal discontinuity will occur is received. According to one or more embodiments of the disclosure, the indication of transmission property information provides an indication of a time period during which one of a coherency of a transmitted waveform will be broken and coherency of a transmitted waveform is expected to be unstable. According to one or more embodiments of the disclosure, the indication of transmission property information provides an indication of a time period during which coherency of a transmitted waveform is expected to be stable. According to one or more embodiments of the disclosure, a criteria for defining a stable signal before providing the indication of transmission property information is received. According to one or more embodiments of the disclosure, the reconfiguration of precoding weights creates a phase and amplitude discontinuity in a transmitted signal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
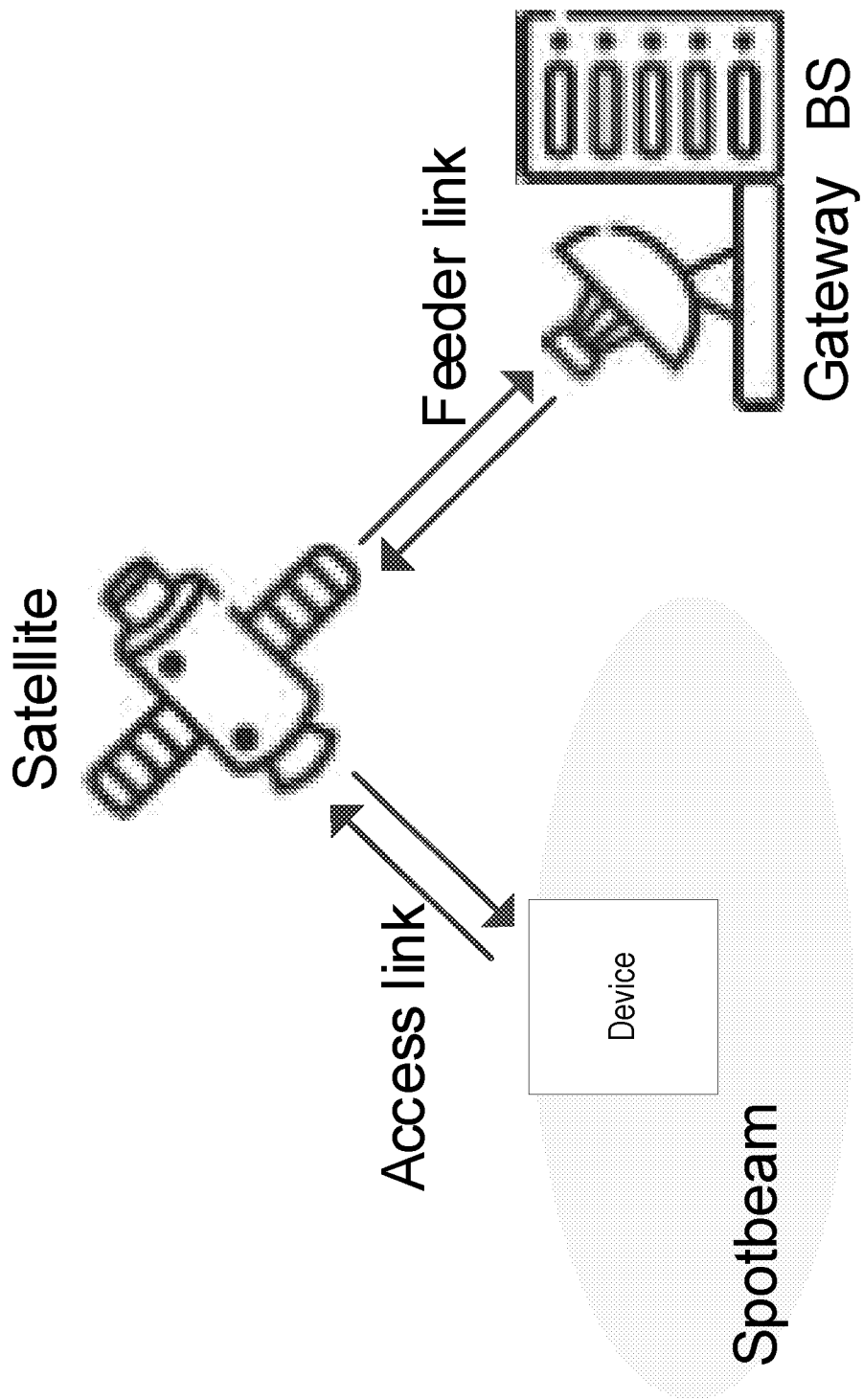
FIG. 1 is a diagram of an example non-terrestrial communication network.

Before describing in detail exemplary embodiments, it is noted that the embodiments reside primarily in combinations of apparatus components and processing steps related to reliable link performance for cellular Internet of things (IoT) and New Radio (NR) in non-terrestrial networks. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a satellite, a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, integrated access and backhaul (IAB) node, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), integrated access and backhaul (IAB), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of a satellite, ground based network node or base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide reliable link performance for cellular Internet of things (IoT) and New Radio (NR) in non-terrestrial networks. In some embodiments, a network node signals to a WD if and for how long the network node can provide a stable and coherent waveform. In some embodiments, the network node signals to the WD at time during which a beam switch takes place. During such time that a coherent waveform cannot be provided or when a beam switch takes place, the WD avoids combining received radio blocks to avoid error in such combining.

Figure 2:
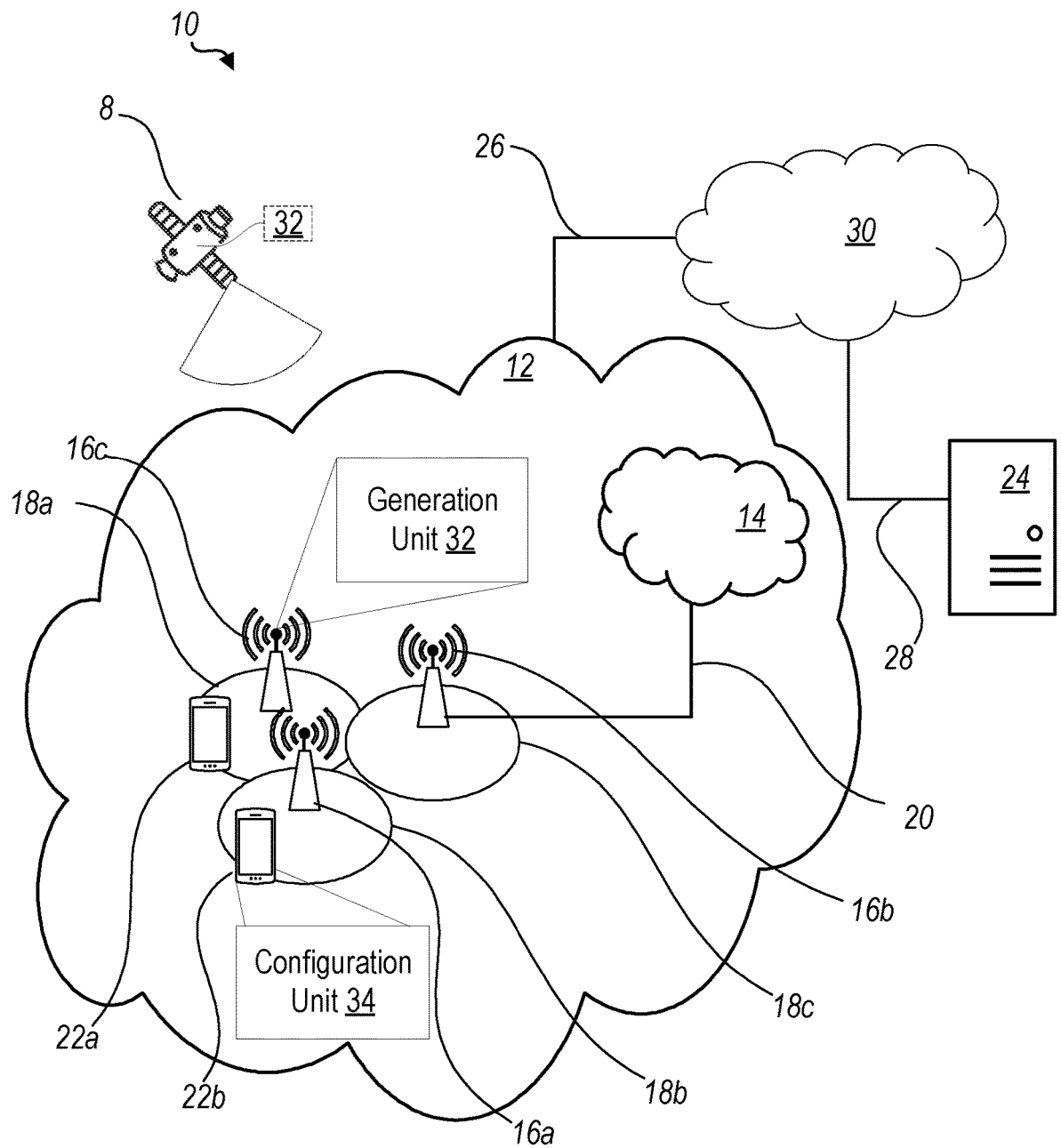
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G). The communication system 10 of FIG. 2 comprises a satellite 8, an access network 12, such as a radio access network, and a core network 14. The access network 12 comprises a plurality of ground based network nodes 16a, 16b, 16c (referred to collectively as network nodes 16), such as NB s, eNB s, gNBs or other types of wireless access points, each defining a corresponding coverage area 18a, 18b, 18c (referred to collectively as coverage areas 18). Each ground based network node 16a, 16b, 16c is connectable to the core network 14 over a wired or wireless connection 20. A first wireless device (WD) 22a located in coverage area 18a is configured to wirelessly connect to, or be paged by, the corresponding ground based network node 16c. A second WD 22b in coverage area 18b is wirelessly connectable to the corresponding ground based network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding ground based network node 16. Note that although only two WDs 22 and three network nodes 16 are shown for convenience, the communication system may include many more WDs 22 and network nodes 16. Also, it is contemplated that a WD 22 can be in simultaneous communication and/or configured to separately communicate with more than one ground based network node 16 and more than one type of ground based network node 16. For example, a WD 22 can have dual connectivity with a ground based network node 16 that supports LTE and the same or a different ground based network node 16 that supports NR. As an example, WD 22 can be in communication with an eNB for LTE/E-UTRAN (Evolved-UMTS Terrestrial Radio Access Network) and a gNB for NR/NG-RAN (Radio Access Network). The WD 22 may be in communication with a satellite 8 and/or one or more ground based network nodes 16. In one or more embodiments satellite 8 is a type of network node 16 that performs network node 16 functions as described herein where satellite 8 is modified as to include hardware and/or software as described herein with respect to network node 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a ground based network node 16 may not or need not be informed about the past routing of an incoming downlink communication with data originating from a host computer 24 to be forwarded (e.g., handed over) to a connected WD 22a. Similarly, the ground based network node 16 need not be aware of the future routing of an outgoing uplink communication originating from the WD 22a towards the host computer 24. A ground based network node 16 is configured to include a generation unit 32 which is configured to generate transmission property information, the transmission property information configuring the WD to avoid combining received radio blocks during a time at which a coherent waveform is not available from the network node and/or a time at which a beam switch is to occur. A wireless device 22 is configured to include a configuration unit 34 configured to receive transmission property information indicative of a time at which a coherent waveform is not available from the network node and/or a time at which a beam switch is to occur. Note that the satellite 8 may include some or all of the components and functionality of ground based network node 16, and consequently, the ground based network nodes 16 and space borne satellite 8 may be referred to collectively herein as network nodes. Thus, for example, satellite 8 includes an RF interface to communicate with a ground based network node 16 and/or a wireless device 22. Further, the satellite 8 may include the generation unit 32, which may be implemented in a processor and/or processing circuitry of the satellite 8, to generate transmission property information as described herein with reference to generation unit 32, wherein the RF interface of the satellite 8 communications transmits the transmission property information to the WD 22.

Example implementations, in accordance with an embodiment, of the satellite 8, WD 22, ground based network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the ground based network node 16 and or the wireless device 22.

The communication system 10 further includes a ground based network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the ground based network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the ground based network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the ground based network node 16 further has software 74 stored internally in, for example, memory 72, or stored in external memory (e.g., database, storage array, network storage device, etc.) accessible by the ground based network node 16 via an external connection. The software 74 may be executable by the processing circuitry 68. The processing circuitry 68 may be configured to control any of the methods and/or processes described herein and/or to cause such methods, and/or processes to be performed, e.g., by ground based network node 16. Processor 70 corresponds to one or more processors 70 for performing ground based network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to ground based network node 16. For example, processing circuitry 68 of the ground based network node 16 may include generation unit 32 configured to perform one or more network node 16 functions described herein. In one or more embodiments, generation unit 32 is configured to generate transmission property information, the transmission property information configuring the WD to avoid combining received radio blocks during a time at which a coherent waveform is not available from the network node and/or a time at which a beam switch is to occur.

The communication system 10 further includes the WD 22 already referred to. The WD 22 may have hardware 80 that may include a radio interface 82 configured to set up and maintain a wireless connection 64 with a ground based network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. A configuration unit 34 of the processor 86 may be configured to perform one or more WD 22 functions as described herein. In one or more embodiments, configuration unit 34 is configured to receive transmission property information indicative of a time at which a coherent waveform is not available from the network node and/or a time at which a beam switch is to occur.

Figure 3:
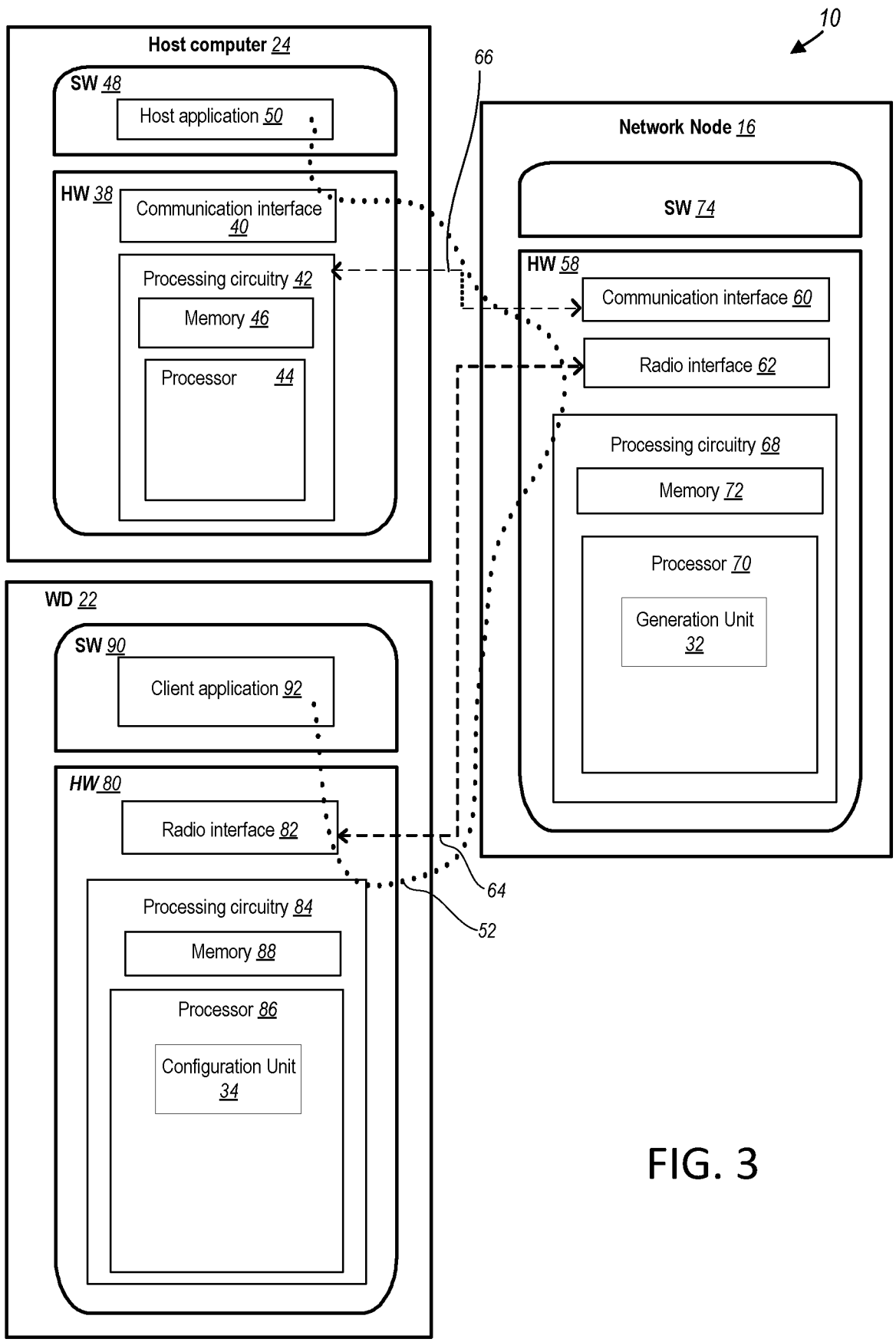
FIG. 3 is a block diagram of a host computer communicating via a network node with a wireless device over an at least partially wireless connection according to some embodiments of the present disclosure.

In some embodiments, the inner workings of the satellite 8, ground based network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the ground based network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the ground based network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the ground based network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the ground based network node 16 with a radio interface 62. In some embodiments, the ground based network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a ground based network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the ground based network node 16, and/or preparing/terminating/maintaining/supporting/ending in receipt of a transmission from the ground based network node 16.

Figures 4, 5:
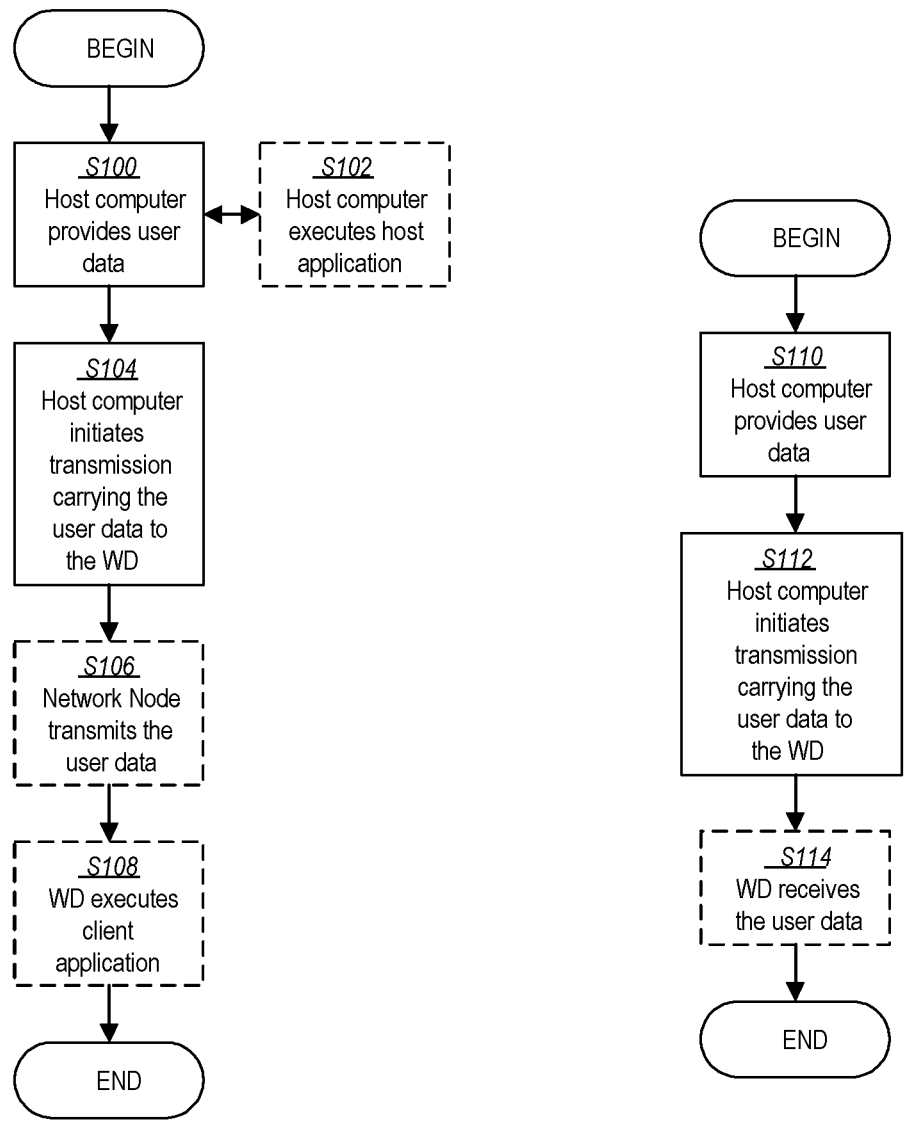
FIG. 4 is a flowchart illustrating exemplary methods implemented in a communication system including a host computer, a network node and a wireless device for executing a client application at a wireless device according to some embodiments of the present disclosure.
FIG. 5 is a flowchart illustrating exemplary methods implemented in a communication system including a host computer, a network node and a wireless device for receiving user data at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a satellite 8, host computer 24, a ground based network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the ground based network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a satellite 8, host computer 24, a ground based network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the ground based network node 16, in accordance with the teachings of the embodiments described throughout this disclosure. In an optional third step, the WD 22 receives the user data carried in the transmission (Block S114).

Figure 6:
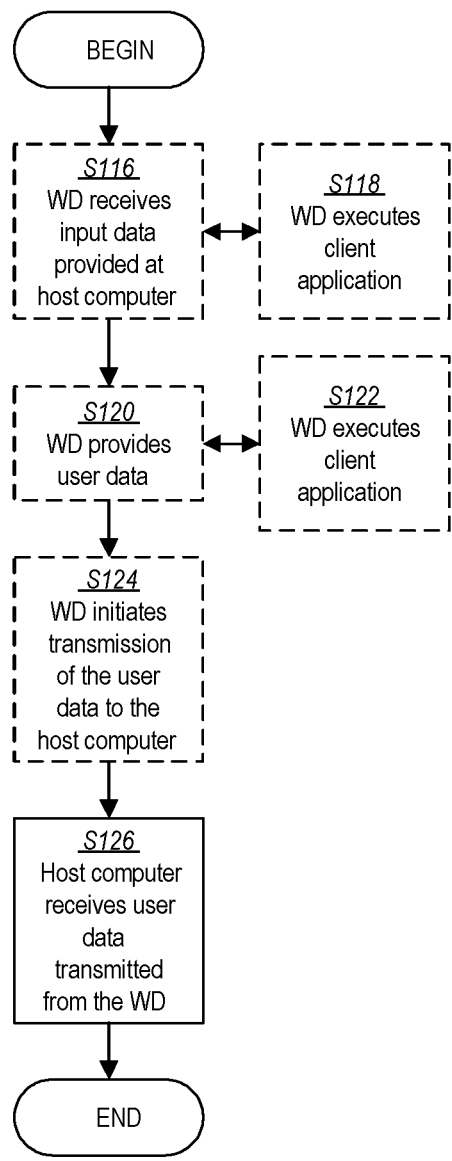
FIG. 6 is a flowchart illustrating exemplary methods implemented in a communication system including a host computer, a network node and a wireless device for receiving user data from the wireless device at a host computer according to some embodiments of the present disclosure.

FIG. 6 is a flowchart illustrating an exemplary method implemented in a communication system, such as, for example, the communication system of FIG. 2, in accordance with one embodiment. The communication system may include a satellite 8, a host computer 24, a ground based network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 7:
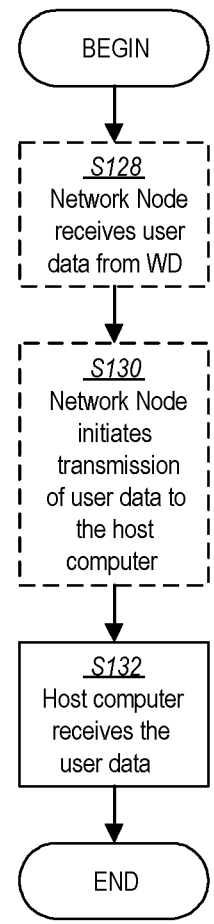
FIG. 7 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 2, in accordance with one embodiment. The communication system may include a satellite 8, host computer 24, a ground based network node 16 and a WD 22, which may be those described with reference to FIGS. 2 and 3. In an optional first step of the method, in accordance with the teachings of the embodiments described throughout this disclosure, the ground based network node 16 receives user data from the WD 22 (Block S128). In an optional second step, the ground based network node 16 initiates transmission of the received user data to the host computer 24 (Block S130). In a third step, the host computer 24 receives the user data carried in the transmission initiated by the ground based network node 16 (Block S132).

Figure 8:
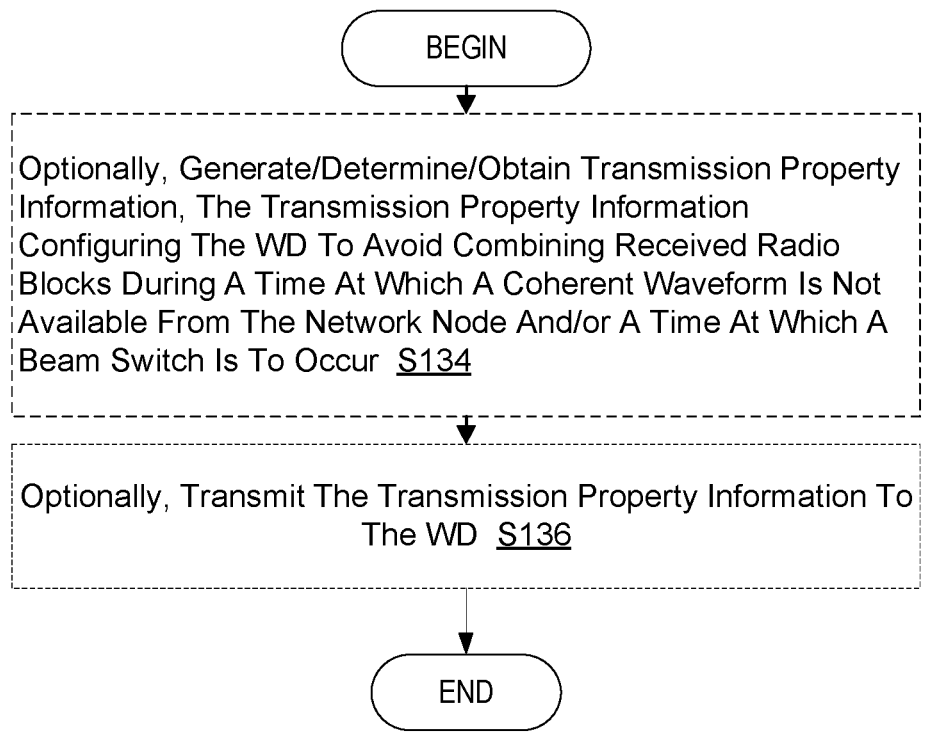
FIG. 8 is a flowchart of an exemplary process in a network node for generating and transmitting transmission property information according to some embodiments of the present disclosure.

FIG. 8 is a flowchart of an exemplary process in a network node, such as a satellite 8 or ground based network node 16, for generating and transmitting transmission property information according to some embodiments of the present disclosure. One or more blocks described herein may be performed by one or more elements of satellite 8 or ground based network node 16 such as by one or more of processing circuitry 68, processor 70 (including generation unit 32), radio interface 62 and/or communication interface 60. Ground based network node 16 such as via processing circuitry 68 and/or processor 70 and/or radio interface 62 and/or communication interface 60 is optionally configured to generate transmission property information, the transmission property information configuring the WD to avoid combining received radio blocks during a time at which a coherent waveform is not available from the network node and/or a time at which a beam switch is to occur (Block S134) The process also optionally includes transmitting the transmission property information to the WD 22 (Block S136).

Figure 9:
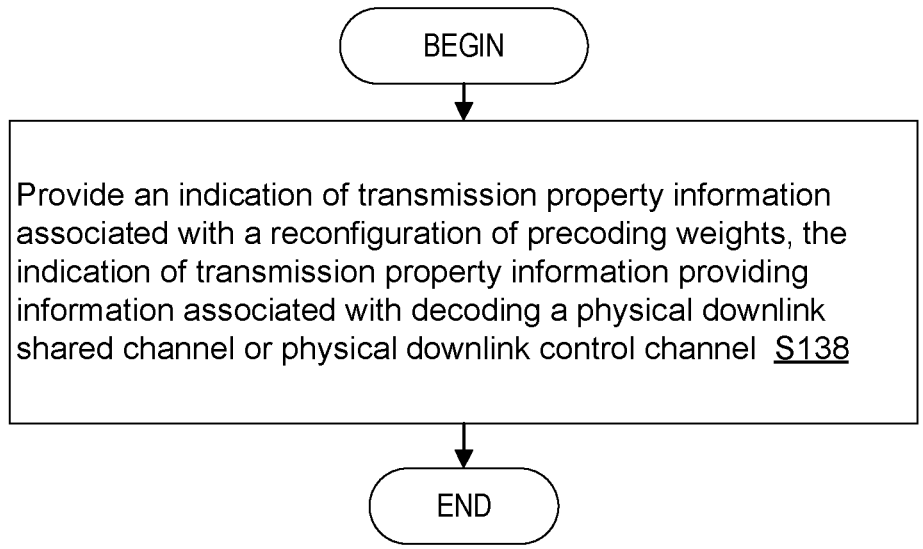
FIG. 9 is a flowchart of another exemplary process in a network node for generating and transmitting transmission property information according to some embodiments of the present disclosure.

FIG. 9 is a flowchart of another exemplary process in a network node, such as a satellite 8 (i.e., a type of network node 16) or ground based network node 16, for generating and transmitting transmission property information according to some embodiments of the present disclosure. One or more blocks described herein may be performed by one or more elements of satellite 8 or ground based network node 16 such as by one or more of processing circuitry 68, processor 70 (including generation unit 32), radio interface 62 and/or communication interface 60. In one or more embodiments, network node 16, 8 such as via one or more of processing circuitry 68, processor 70, generation unit 32, communication interface 60 and radio interface 62 is configured to provide (Block S138) an indication of transmission property information associated with a reconfiguration of precoding weights where the indication of transmission property information provides information associated with decoding a physical downlink shared channel or physical downlink control channel, as described herein.

According to one or more embodiments, the indication of transmission property information corresponds to a transmission configuration indication, TCI, that indicates a TCI state to implement after the reconfiguration of precoding weights. According to one or more embodiments, the indication of transmission property information indicates a plurality of TCI state configurations. According to one or more embodiments, the indication of transmission property information is transmitted via RRC signaling, and the processing circuitry 68 is further configured to cause activation, via MAC CE signaling, of one of the plurality of TCI states before the reconfiguration of precoding weights.

According to one or more embodiments, the indication of transmission property information is transmitted via RRC signaling, and the processing circuitry 68 is further configured to cause transmission of a DCI for activation of one of the plurality of TCI states before the reconfiguration of precoding weights. According to one or more embodiments, the processing circuitry 68 is further configured to configure a time gap between a time slot in which downlink DCI is transmitted and a time slot where the reconfiguration of precoding weights occurs. According to one or more embodiments, the processing circuitry 68 is further configured to configure a time gap between a time slot in which a PDSCH transmission is configured to start and a time slot where the reconfiguration of precoding weights occurs.

According to one or more embodiments, the processing circuitry is further configured to cause transmission of signaling indicating a time period during which at least one of a phase shift and time shift of a signal discontinuity will occur. According to one or more embodiments, the indication of transmission property information provides an indication of a time period during which one of a coherency of a transmitted waveform will be broken and coherency of a transmitted waveform is expected to be unstable. According to one or more embodiments, the indication of transmission property information provides an indication of a time period during which coherency of a transmitted waveform is expected to be stable. According to one or more embodiments, the processing circuitry is further configured to provide a criteria for defining a stable signal before providing the indication of transmission property information. According to one or more embodiments, the reconfiguration of precoding weights creates a phase and amplitude discontinuity in a transmitted signal.

Figure 10:
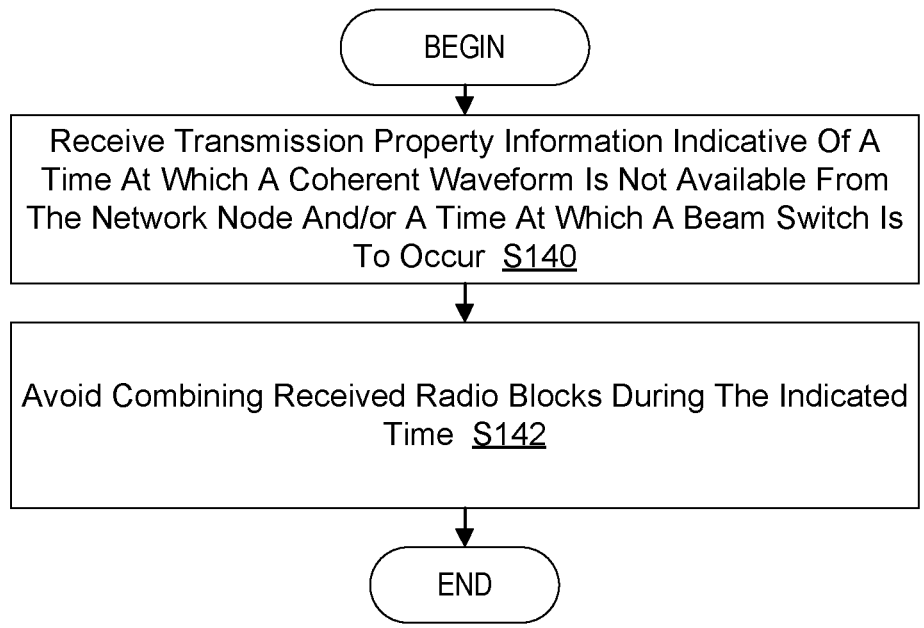
FIG. 10 is a flowchart of an exemplary process in a wireless device for receiving and processing transmission property information according to some embodiments of the present disclosure.

FIG. 10 is a flowchart of an exemplary process in a wireless device 22 for receiving and processing transmission property information according to some embodiments of the present disclosure. One or more blocks described herein may be performed by one or more elements of wireless device 22 such as by one or more of processing circuitry 84, processor 86 (including configuration unit 34), radio interface 82 and/or communication interface 60. Wireless device 22 such as via processing circuitry 84 and/or processor 86 and/or radio interface 82 is configured to receive transmission property information indicative of a time at which a coherent waveform is not available from the network node and/or a time at which a beam switch is to occur (Block S140). The process also includes avoid combining received radio blocks during the indicated time (Block S142).

Figure 11:
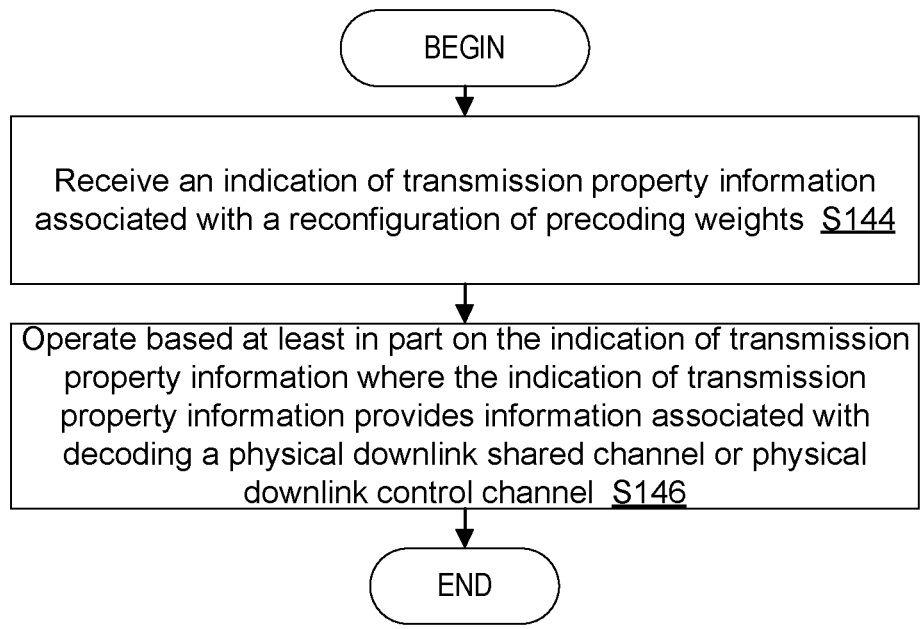
FIG. 11 is a flowchart of another exemplary process in a wireless device for receiving and processing transmission property information according to some embodiments of the present disclosure.

FIG. 11 is a flowchart of another exemplary process in a wireless device 22 for receiving and processing transmission property information according to some embodiments of the present disclosure. One or more blocks described herein may be performed by one or more elements of wireless device 22 such as by one or more of processing circuitry 84, processor 86 (including configuration unit 34), radio interface 82 and/or communication interface 60. In one or more embodiments, wireless device 22 such as via one or more of processing circuitry 84, processor 86, configuration unit 34 and radio interface 82 is configured to receive (Block S144) an indication of transmission property information associated with a reconfiguration of precoding weights, as described herein. In one or more embodiments, wireless device 22 such as via one or more of processing circuitry 84, processor 86, configuration unit 34 and radio interface 82 is configured to operate (Block S146) based at least in part on the indication of transmission property information where the indication of transmission property information provides information associated with decoding a physical downlink shared channel or physical downlink control channel, as described herein.

According to one or more embodiments, the indication of transmission property information corresponds to a transmission configuration indication, TCI, that indicates a TCI state to implement after the reconfiguration of precoding weights. According to one or more embodiments, the indication of transmission property information indicates a plurality of TCI state configurations. According to one or more embodiments, the indication of transmission property information is transmitted via RRC signaling, and where the processing circuitry 84 is further configured to activate one of the plurality of TCI states before the reconfiguration of precoding weights based at least in part on MAC signaling.

According to one or more embodiments, the indication of transmission property information is transmitted via RRC signaling, and where the processing circuitry 84 is further configured to activate one of the plurality of TCI states before the reconfiguration of precoding weights based at least in part on a DCI for activation. According to one or more embodiments, the processing circuitry 84 is further configured to operate according to a time gap between a time slot in which downlink DCI is transmitted and a time slot where the reconfiguration of precoding weights occurs. According to one or more embodiments, the processing circuitry 84 is further configured to operate according to a time gap between a time slot in which a PDSCH transmission is configured to start and a time slot where the reconfiguration of precoding weights occurs.

According to one or more embodiments, the processing circuitry 84 is further configured to receive transmission of signaling that indicates a time period during which at least one of a phase shift and time shift of a signal discontinuity will occur. According to one or more embodiments, the indication of transmission property information provides an indication of a time period during which one of a coherency of a transmitted waveform will be broken and coherency of a transmitted waveform is expected to be unstable. According to one or more embodiments, the indication of transmission property information provides an indication of a time period during which coherency of a transmitted waveform is expected to be stable. According to one or more embodiments, the processing circuitry 84 is further configured to receive a criteria for defining a stable signal before providing the indication of transmission property information. According to one or more embodiments, the reconfiguration of precoding weights creates a phase and amplitude discontinuity in a transmitted signal.

Having described the general process flow of arrangements of the disclosure and having provided examples of hardware and software arrangements for implementing the processes and functions of the disclosure, the sections below provide details and examples of arrangements for reliable link performance for cellular Internet of things (IoT) and New Radio (NR) in non-terrestrial networks.

Embodiment 1

Figure 12:
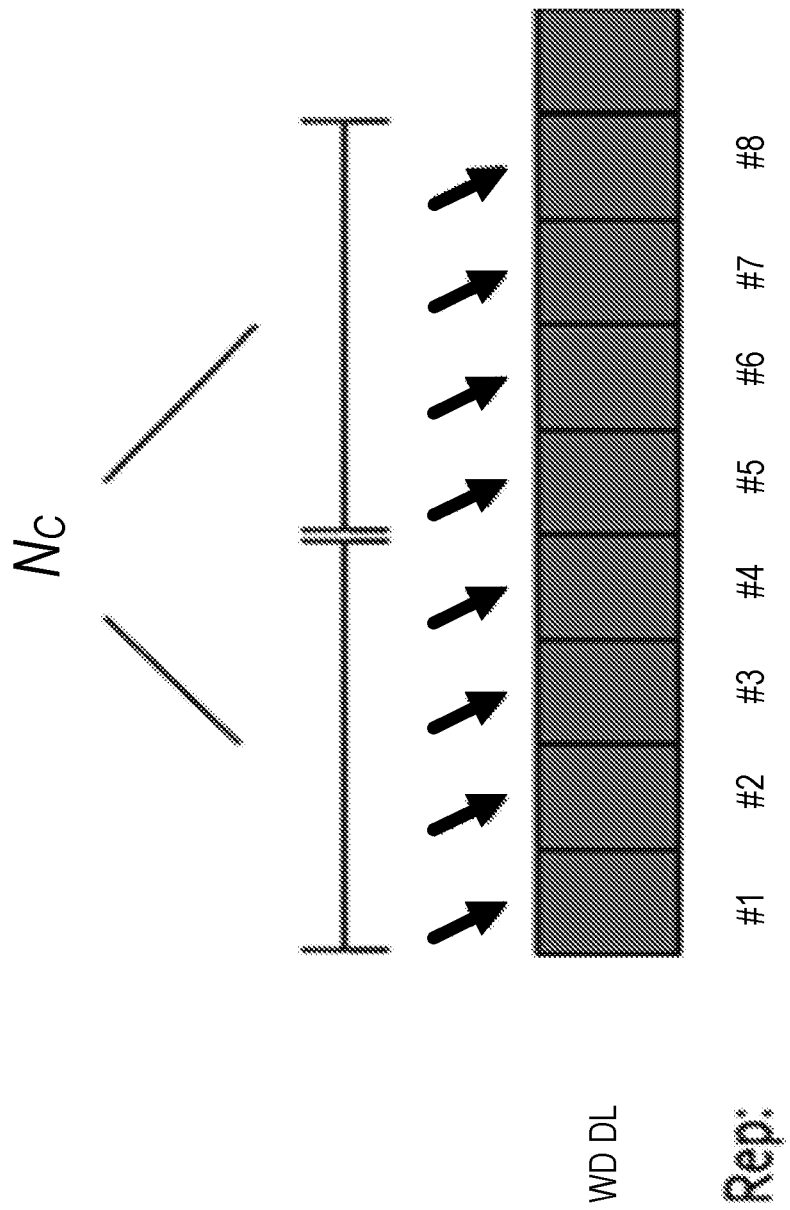
FIG. 12 illustrates TTIs during which the WD can assume that a waveform is coherent.

In a first embodiment the radio interface 62 of the transmitting node, which may be a ground based network node 16 or satellite 8 (i.e., type of network node 16) may signal to the transceiver (e.g., radio interface 82) of the wireless device 22 if, and for how long, the transmitting node 8, 16 can provide a stable and coherent waveform. This may, for example, include the expected TTIs during which the WD 22 can assume that the waveform is coherent as depicted in FIG. 12.

Embodiment 2

In a second embodiment the transmitting node, 8, 16 may signal to the WD 22 that it should not assume that the transmitter of the transmitting node 8, 16, is able to provide a stable and coherent waveform across time repeated radio blocks.

Embodiment 3

In a third embodiment the transmitting node 8, 16 may signal to the WD 22 when in time the transmitting node 8, 16 will break the coherency of the transmitted waveform.

Embodiment 4

In another embodiment, prior to when the transmitter node 8, 16, signals its capabilities to provide a stable waveform, the receiving node (i.e., WD 22, optionally signals a stable waveform definition to the transmitting node 8, 16. The definition includes information of what is considered a stable signal. The definition can for example be the tolerable variations in amplitude, frequency $f_c$ and phase $\rho_c$. For example, $f_c$ should be guaranteed to be within a range $[f_{low}, f_{high}]$, or with a certain probability. The transmitting note then signals time information concerning when this constraint cannot be fulfilled.

Signaling Examples

The information may be in the format of absolute time, or in a format adapted to the applicable radio access technology. For EC-GSM-IoT, a time indication may be based on the concepts of bursts, radio blocks, time division multiple access (TDMA) frames, hyperframes, and/or (e-enhanced) discontinuous reception (DRX) cycles. For NB-IoT and LTE-M, the time indication may be based on concepts of orthogonal frequency division multiplex (OFDM) symbols, slots, subframes, radio frames, hyperframes, and/or (e)DRX cycles.

The information may, e.g., be signaled in the physical layer, in the medium access control (MAC) layer or the radio resource control (RRC) layer. The signaling may be in the format of a physical layer indication, or in the format of an encoded bit sequence. The signaling may be dedicated, common or broadcasted and may reuse already existing formats or signaling.

An example of the signaling form is system information broadcast by the cell that may be provided by network node 16, or in a dedicated RRC message. The timings of a phase discontinuity are expressed in a similar form as the current NR Synchronization Signal Block (SSB) measurement timing configuration (SMTC), specified in 3GPP Technical Standard (TS) 38.331, or discovery signal measurement timing configuration (DTMC) in LTE, specified in 3GPP TS 36.331. That is, there is periodicity and offset as well as window duration during which a WD 22 may assume that the waveform is not continuous. The offset may be relative to serving cell timing or absolute time. In NR, this may be specific to one SSB beam, or all SSB beams of the SSB Burst; that is all SSBs belonging to a same physical cell identify (PCI) and same frequency location.

Solutions Related to NR TCI Reconfigurations Due to Beam Switching

Embodiment 5

In another embodiment, a NR WD 22 is configured with a list of M TCI-State configurations for decoding the respective PDCCH or PDSCH.

In one example, TCI state m=0, . . . , M−1 is activated in the time interval $[t_m, t_{m+1})$, where $t_m$ is a configurable parameter. Channel coherence can be assumed within the time interval $[t_m, t_{m+1})$ using TCI state m. In other words, there are M TCI-state configurations, and the active TCI-state is cycled among these M TCI-State configurations where the $m^{th}$ TCI-State is active in the time interval $[t_m, t_{m+1})$.

In another example, the number of slots in which a TCI state is active, denoted by T, is configured. Then MT equals the duration of a TCI-state window, in which each of the M TCI states is active for T slots. An offset value, denoted by o, may be configured.

Denote by $n_{s,f}^\mu$ the slot number within a frame for subcarrier spacing configuration μ. Denote by $n_f$ the system frame number. TCI state m is used starting from the slot with number $n_{s,f}^\mu$ in a frame with number $n_f$. The values of $n_{s,f}^\mu$ and $n_f$ can be determined by the following equation:

$(n_f N_{slot}^{frame,\mu} + n_{s,f}^\mu - mT - o) \mod(MT) = 0$ where $N_{s,f}^\mu$ is the number of slots per frame for subcarrier spacing configuration μ. Channel coherence can be assumed within each of the time intervals in which a TCI state is applied.

In a time interval where the TCI state m is applied, the WD 22 such as via processing circuitry 84 uses for radio link monitoring the RS (e.g. CSI-RS or SS/PBCH) provided for the active TCI state for PDCCH/PDSCH reception. Channel coherence can be assumed within each of the time intervals in which a TCI state is applied.

In a time interval where the TCI state m is applied, the WD 22 such as a via processing circuitry 84 uses for measurements the RS (e.g. CSI-RS or SS/PBCH) provided for the active TCI state for PDCCH/PDSCH reception. Channel coherence can be assumed within each of the time intervals in which a TCI state is applied.

Embodiment 6

In NR Release-15, it is possible to schedule a PDSCH with time repetition, by the RRC parameter, pdsch-AggregationFactor (Ref: 3GPP TS 38.331). In this case, the PDSCH is scheduled by DCI carrying a downlink scheduling grant, and the PDSCH is transmitted such as via radio interface 62 of network node 16 in multiple adjacent slots up until the number of repetitions as determined by pdsch-AggregationFactor have been met.

Figure 13:
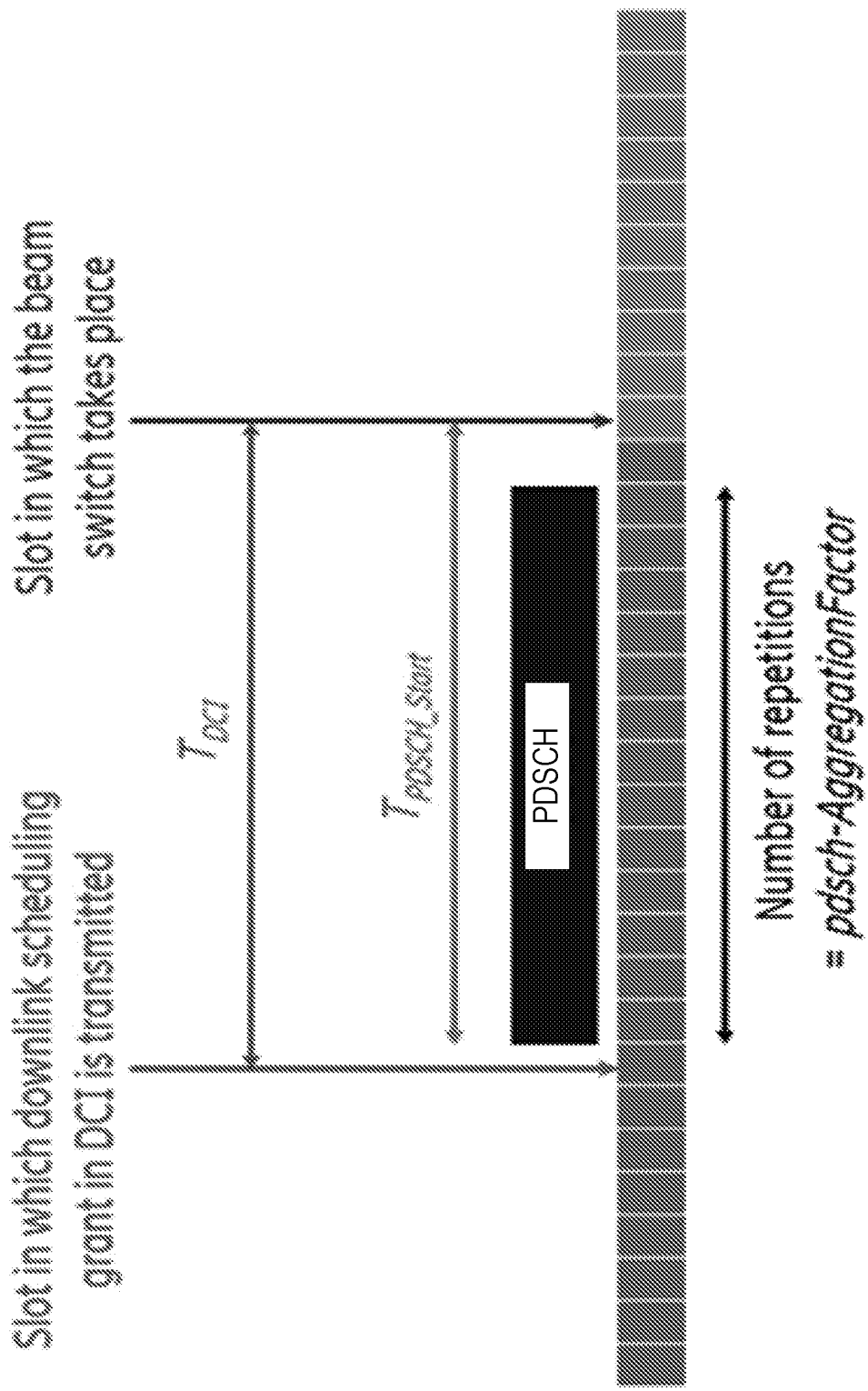
FIG. 13 illustrates a minimum time gap to determine a slot at which a beam switch takes place.

In this embodiment, a transmitter, which can be a network node 16 (e.g., gNB) serving a NTN, can reconfigure the precoding weights to steer the direction of a beam at a given time-slot (i.e., reconfiguration of one or more precoding weights may be referred to as a beam switch herein). To avoid transmitting PDSCH repetitions (when pdsch-AggregationFactor is configured) during the beam switch, a minimum time gap between the slot in which downlink control information (DCI) is transmitted and the slot in which the beam switch takes place can be defined, i.e., configured by, for example, processing circuitry 68 of network node 16. As illustrated in FIG. 13, the minimum time gap, $T_{DCI,min}$ can be defined such that $T_{DCI} > T_{DCI,min}$, where $T_{DCI,min}$ may include one or more of the following:

Number of slots required to complete the pdsch-AggregationFactor number of PDSCH repetitions; and Time offset between the last symbol PDCCH carrying the downlink DCI and the first symbol of PDSCH.

Alternatively, transmission of PDSCH repetitions such a via radio interface 62 can be avoided during the beam switch by defining a minimum time gap between the start of the slot in which PDSCH transmission starts and the slot in which the beam switch takes place. As illustrated in FIG. 13, the minimum time gap $T_{PDSCH\_Start,min}$ can be defined such that $T_{PDSCH\_Start} > T_{PDSCH\_Start,min}$ where $T_{PDSCH\_Start,min}$ may include the number of slots required to complete the pdsch-AggregationFactor number of PDSCH repetitions.

Embodiment 7

In NR Release-15, a PDCCH control resource set (CORESET) can be RRC configured with up to M TCI states, and one of the TCI states can be activated by radio interface 62 of network node 16 sending a MAC control element (CE) to the WD 22. The value of N is 128 for frequency range 2 (FR2) and up to 8 for frequency range 1 (FR1). After receiving such as via radio interface 82 the MAC CE to activate a TCI state, the WD 22 such as via radio interface 82 may send an acknowledgement (ACK) to confirm reception of the MAC CE. The network can assume the WD 22 will use the newly activated TCI state 3 milliseconds after the ACK was transmitted from the WD 22.

Figure 14:
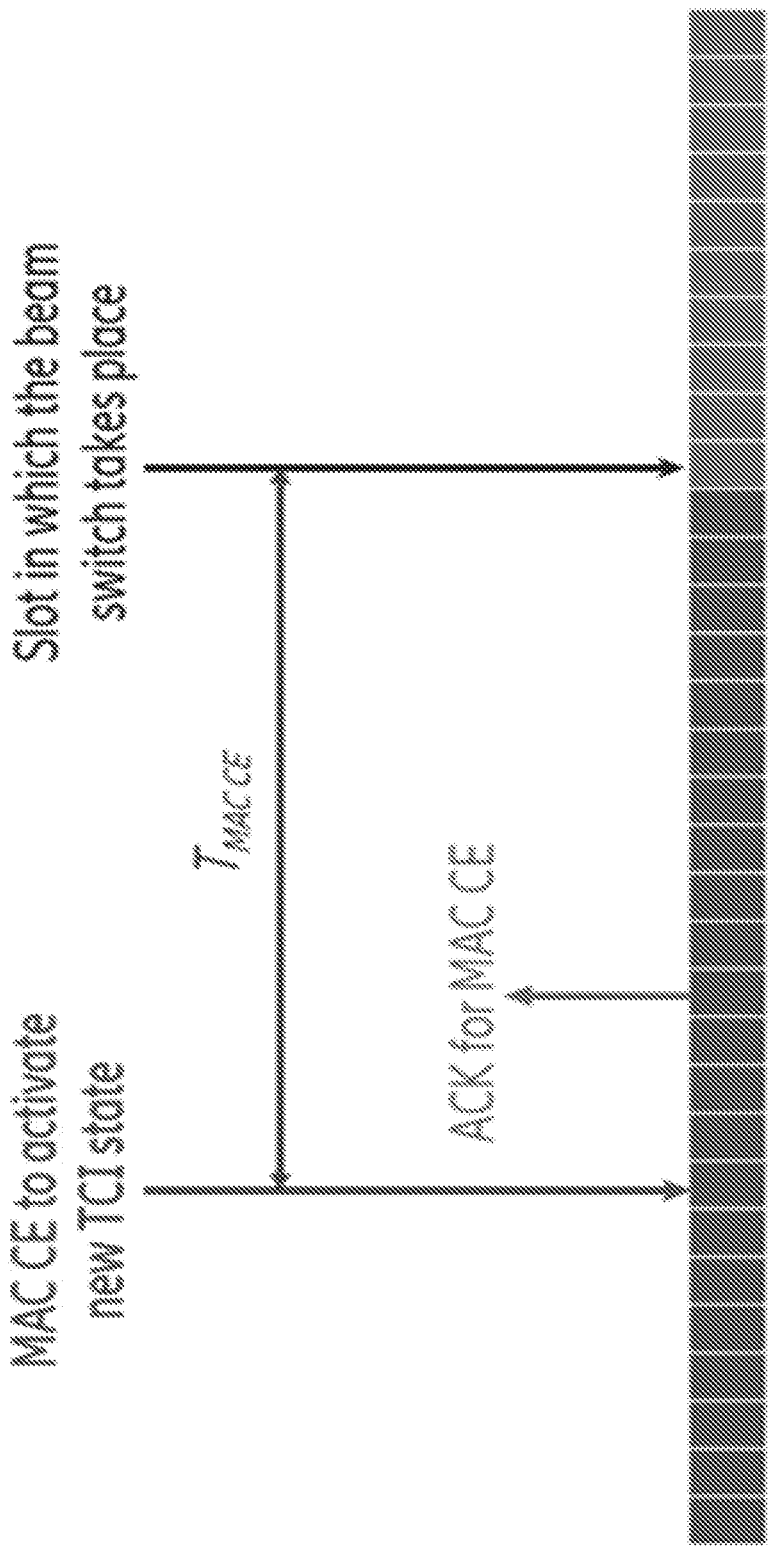
FIG. 14 is an alternative illustration of a minimum time gap to determine a slot at which a beams switch takes place.

In Embodiment 7, a transmitter, which can be a gNB serving a NTN, can perform a beam switch at a given time-slot. In some cases, an NTN WD 22 may be monitoring a PDCCH CORESET with one active TCI state that corresponds to the beam currently used by the gNB for transmitting PDCCH to the NTN WD 22. Hence, in these cases, a new TCI state may be activated for the PDCCH CORESET before the beam switch takes place. In this embodiment, a minimum time gap between the slot in which the MAC CE message to activate a new TCI state for PDCCH CORESET is sent and the slot in which the beam switch takes place can be defined. As illustrated in FIG. 14, the minimum time gap $T_{MAC\_CE}$ can be defined such that $T_{MAC\_CE} > T_{MAC\_CE,min}$ where $T_{MAC\_CE,min}$ may include one or more of the following:

Time to decode/process the MAC CE message;
Time to prepare and transmit the ACK corresponding to the MAC CE message;
A constant delay after the ACK is transmitted (for example, the 3 ms delay); and
Additional time margin to retransmit the MAC CE message in cases the WD 22 does not receive the MAC CE message and/or the WD 22's ACK is not received successfully.

In some cases, the PDSCH reuses the same TCI state as the PDCCH. Hence, in these cases, the above minimum time gap may also be applicable for activating a new TCI state for PDSCH.

The benefit of this embodiment is that the WD 22 can continue to reliably receive via radio interface 82 the PDCCH in the CORESET using the newly activated TCI state which corresponds to the new beam used by the network after the beam switch.

Embodiment 8

In NR Release-15, there is a possibility to explicitly indicate the TCI state for the PDSCH in DCI. When the WD 22 is configured with the tci-PresentInDCI option, the network/network node 16 such as via processing circuitry 68 activates up to 8 TCI states out of the total number of TCI states that are RRC configured, and a 3-bit field in DCI indicates to the WD 22 which one among the activated TCI states should be used for PDSCH.

In this embodiment, activation of TCI states for PDSCH may not be needed when a transmitter performs a beam switch at a given time slot. TCI states corresponding to the currently used beam and the new beam that the gNB, i.e., network node 16, intends to switch to can be pre-activated as it is possible to activate multiple TCI state when the tci-PresentInDCI option is configured. Before the gNB performs the beam switch, the gNB can indicate such as via radio interface 62 via the TCI field the TCI state corresponding to the currently used beam to the WD 22 to be used for PDSCH. After the gNB performs the beam switch, the gNB can indicate such a via radio interface 62 via the TCI field the TCI state corresponding to the new beam to the WD 22 to be used for PDSCH.

Embodiment 9

Due to the deterministic and periodic motion of communication satellites 8, the phase and/or amplitude discontinuities in the transmitted signal due to reconfiguration of the precoding weights steering the direction of a beam can sometimes be expected to follow a predictable pattern. For example, for a GEO satellite 8 with inclined orbit where the transmitter of the satellite 8 circles through a sequence of fixed precoding weights during the orbital period of the satellite 8 (~1 day), the signal discontinuity experienced at a given location at a given time of the day can be known beforehand.

In this embodiment, the transmitting node 8, 16, signals to the receiver (e.g., WD 22) the phase shift and/or amplitude shift of the signal discontinuity together with time at which it will occur. Depending on the spatial variations of the phase/amplitude shifts, this information can be, e.g., cell-specific or WD 22-specific.

In another embodiment, a stationary WD 22 can estimate and memorize the experienced phase/amplitude discontinuity for a given change of precoding weights at its given (fixed) location. In this case, the transmitting node 8, 16, signals to the receiver (e.g., WD 22) which change of precoding weights (e.g., by means of a sequence number) will occur at a given point in time. The receiver such as via processing circuitry 84 associates the sequence number with the given phase/amplitude discontinuity and gradually learns the characteristics of the signal discontinuities associated with different precoding weight changes.

Solutions Related to the Receiver Implementation

Embodiment 10

In yet another embodiment, the receiver (e.g., WD 22) such as via processing circuitry 84 adapts its combining method of repeated received radio blocks according to the information received according to embodiment 1 to 9.

Thus according to some aspects, a method of indicating/receiving transmission property information for a transmission from a network node 8, 16 to/at a wireless device 22 (or vice versa), where the information includes or is associated with one or more of:

frequency and phase reference drifting, and jittering, in time domain; and a reconfiguration of the precoding weights steering the direction of a beam creating phase and amplitude discontinuity in the transmitted signal.

According to this aspect, the indicated transmission property information includes at least one of:

an indication of a duration in time for which the transmission is expected to be stable with a coherent waveform, an indication of when in time the coherency of the transmitted waveform will be broken, an indication of a first DCI for scheduling a PDSCH with an associated first minimum time gap constraint before the reconfiguration of precoding weights, an indication of a MAC CE message to activate a new TCI state for a PDCCH CORESET with an associated second minimum time gap constraint before the reconfiguration of precoding weights; and an indication of a second DCI to indicate a new TCI for PDSCH after the reconfiguration of precoding weights.

According to this aspect, in some embodiments, the transmission property information indication is done via one or more of physical layer signaling, MAC layer signaling, and RRC signaling. In some embodiments, the indication of the duration in time for which the transmission is expected to be stable with a coherent waveform is given in units of TTIs. In some embodiments, the receiver, i.e., wireless device, adapts such as via processing circuitry 84 its combining of repeated received radio blocks according to the indicated transmission property information. In some embodiments, the PDSCH scheduled by a first DCI has a preconfigured number of repetitions determined by the RRC parameter pdsch-AggregationFactor. In some embodiments, the first minimum time gap is determined by one or a combination of the preconfigured number of repetitions and the time offset between the last symbol of PDCCH carrying the DCI and the first symbol of PDSCH. In some embodiments, the second minimum time gap is determined by one or a combination of the time to decode/process the MAC CE message, time to prepare/transmit an ACK corresponding to the MAC CE message, a constant delay after the ACK in transmitted, and an additional time margin. In some embodiments, a TCI field in the second DCI is used to indicate the new TCI state for PDSCH.

In some embodiments, a network node 16, such as a satellite 8 or base station 16, configured to communicate with a wireless device (WD 22), includes processing circuitry 68 configured to generate/determine/obtain transmit transmission property information for use by the WD 22 to avoid combining received radio blocks during a time which a coherent waveform is not available from the network node 8, 16 and/or a time at which a beam switch is to occur. The network node 16 may be further configured to transmit such as via radio interface 62 the transmission property information to the WD.

In some embodiments, the transmission property information includes phase shift and/or amplitude shift of a signal discontinuity experienced by the network node 8, 16 and a time which the signal discontinuity will occur. In some embodiments, a beam switch corresponds to a time during which precoding weights are re-computed to steer a direction of a beam of a satellite 8 in communication with the WD 22. In some embodiments, the transmission property information includes a transmission configuration indication state indicating a time in which coherent transmission from the network node 8, 16 can be assumed by the WD 22.

In some embodiments, a wireless device (WD 22) configured to communicate with a network node, such as a satellite 8 or base station 16, includes processing circuitry configured to receive transmission property information indicative of a time which a coherent waveform is not available from the network node 8, 16 and/or a time at which a beam switch is to occur and avoid combining received radio blocks during the indicated time.

EXAMPLES

Example A1. A network node 16, such as a base station or satellite, configured to communicate with a wireless device 22 (WD 22), the network node 16 configured to, and/or comprising a radio interface 62 and/or comprising processing circuitry 68 configured to:

generate/determine/obtain transmission property information for use by the WD 22 to avoid combining received radio blocks during a time at which a coherent waveform is not available from the network node 16 and/or a time at which a beam switch is to occur; and/or transmit the transmission property information to the WD 22.

Example A2. The network node 16 of Example A1, wherein the transmission property information includes phase shift and/or amplitude shift of a signal discontinuity experienced by the network node 16 and a time which the signal discontinuity will occur.

Example A3. The network node 16 of Example A1, wherein a beam switch corresponds to a time during which precoding weights are re-computed to steer a direction of a beam of a satellite in communication with the WD 22.

Example A4. The network node 16 of Example A1, wherein the transmission property information includes a transmission configuration indication state indicating a time in which coherent transmission from the network node 16 can be assumed by the WD 22.

Example B1. A method implemented in a network node 16 such as a base station or satellite, the method comprising generating/determining/obtaining transmission property information for use by the WD 22 to avoid combining received radio blocks during a time at which a coherent waveform is not available from the network node 16 and/or a time at which a beam switch is to occur; and/or transmitting the transmission property information to the WD 22.

Example B2. The method of Example B1, wherein the transmission property information includes phase shift and/ or amplitude shift of a signal discontinuity experienced by the network node 16 and a time which the signal discontinuity will occur.

Example B3. The method of Example B1, wherein a beam switch corresponds to a time during which precoding weights are re-computed to steer a direction of a beam of a satellite in communication with the WD 22.

Example B4. The method of Example B1, wherein the transmission property information includes a transmission configuration indication state indicating a time in which coherent transmission from the network node 16 can be assumed by the WD 22.

Example C1. A wireless device 22 (WD 22) configured to communicate with a network node 16, such as a base station or satellite, the WD 22 configured to, and/or comprising a radio interface 82 and/or processing circuitry 84 configured to:

receive transmission property information indicative of a time at which a coherent waveform is not available from the network node 16 and/or a time at which a beam switch is to occur; and avoid combining received radio blocks during the indicated time.

Example C2. The WD 22 of Example C1, wherein the transmission property information includes phase shift and/or amplitude shift of a signal discontinuity experienced by the network node 16 and a time which the signal discontinuity will occur.

Example C3. The WD 22 of Example C1, wherein a beam switch corresponds to a time during which precoding weights are re-computed to steer a direction of a beam of a satellite in communication with the WD 22.

Example C4. The WD 22 of Example C1, wherein the transmission property information includes a transmission configuration indication state indicating a time in which coherent transmission from the network node 16 can be assumed by the WD 22.

Example D1. A method implemented in a wireless device 22 (WD 22), the method comprising:

receiving transmission property information indicative of a time at which a coherent waveform is not available from the network node 16 and/or a time at which a beam switch is to occur; and avoiding combining received radio blocks during the indicated time.

Example D2. The method of Example D1, wherein the transmission property information includes phase shift and/or amplitude shift of a signal discontinuity experienced by the network node and a time which the signal discontinuity will occur.

Example D3. The method of Example D1, wherein a beam switch corresponds to a time during which precoding weights are re-computed to steer a direction of a beam of a satellite in communication with the WD 22.

Example D4. The method of Example D1, wherein the transmission property information includes a transmission configuration indication state indicating a time in which coherent transmission from the network node 16 can be assumed by the WD 22.

Example E1. A method of indicating/receiving transmission information (or transmission property information) for a transmission from a network node 16 to a wireless device 22 (or vice-versa), wherein the information includes or is associated with one or more of:

frequency and phase reference drifting, and jittering, in time domain; and a reconfiguration of the precoding weights steering the direction of a beam creating phase and amplitude discontinuity in the transmitted signal and the indicated transmission property information includes at least one of:

an indication of a duration in time for which the transmission is expected to be stable with a coherent waveform, an indication of when in time the coherency of the transmitted waveform will be broken an indication of a first DCI for scheduling a PDSCH with an associated first minimum time gap constraint before the reconfiguration of precoding weights, an indication of a MAC CE message to activate a new TCI state for a PDCCH CORESET with an associated second minimum time gap constraint before the reconfiguration of precoding weights an indication of a second DCI to indicate a new TCI for PDSCH after the reconfiguration of precoding weights.

Example E2. The method of Example E1 where the transmission property information indication is done via one or more of physical layer signaling, MAC layer signaling, and RRC signaling.

Example E3. The method of any of Examples E1-E2 where the indication of the duration in time for which the transmission is expected to be stable with a coherent waveform is given in units of TTIs.

Example E4. The method of any of Examples E1-E3 where the receiver (e.g., radio interface 82) in the wireless device 22 adapts its combining of repeated received radio blocks according to the indicated transmission property information.

Example E5. The method of Example E1 where the PDSCH scheduled by a first DCI has a preconfigured number of repetitions determined by the RRC parameter pdsch-AggregationFactor.

Example E6. The method of any of Examples E1 and E5 where the first minimum time gap is determined by one or a combination of the preconfigured number of repetitions and the time offset between the last symbol of PDCCH carrying the DCI and the first symbol of PDSCH.

Example E7. The method of Example E1 where the second minimum time gap is determined by one or a combination of the time to decode/process the MAC CE message, time to prepare/transmit an ACK corresponding to the MAC CE message, a constant delay after the ACK in transmitted, and an additional time margin.

Example E8. The method of Example E1 where a TCI field in the second DCI is used to indicate the new TCI state for PDSCH.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| 3GPP | 3rd Generation Partnership Project |
| BS | Base Station |
| BL/CE | Bandwidth Limited/Coverage Extended |
| CP | Cyclic Prefix |
| DRX | Discontinuous Reception |
| MAC | Medium Access Control |
| RRC | Radio Resource Control |
| SI | System Information |
| UE | User Equipment |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to operate in a cellular non-terrestrial network, the network node comprising:
   processing circuitry configured to:
      provide an indication of transmission property information associated with a reconfiguration of precoding weights, the indication of transmission property information providing information associated with decoding one of a physical downlink shared channel, PDSCH, and a physical downlink control channel, PDCCH, the transmission property information including information concerning a capability of the network node to provide a stable and coherent transmission waveform based at least in part on whether a measured power gain of combined IQ samples over a sequence of repeated radio blocks relative to a power of a first radio block of the repeated radio blocks exceeds a threshold.

2. The network node of claim 1, wherein the indication of transmission property information corresponds to a transmission configuration indication, TCI, that indicates a TCI state to implement after the reconfiguration of precoding weights.

3. The network node of claim 1, wherein the indication of transmission property information indicates a plurality of TCI state configurations.

4. The network node of claim 3, wherein the indication of transmission property information is transmitted via radio resource control, RRC, signaling; and
   the processing circuitry is further configured to cause activation, via MAC CE signaling, of one of the plurality of TCI states before the reconfiguration of precoding weights.

5. The network node of claim 3, wherein the indication of transmission property information is transmitted via radio resource control, RRC, signaling; and
   the processing circuitry is further configured to cause transmission of a downlink control information, DCI, for activation of one of the plurality of TCI states before the reconfiguration of precoding weights.

6. The network node of claim 1, wherein the processing circuitry is further configured to configure a time gap between a time slot in which downlink control information, DCI, is transmitted and a time slot where the reconfiguration of precoding weights occurs.

7. The network node of claim 1, wherein the processing circuitry is further configured to configure a time gap between a time slot in which a PDSCH transmission is configured to start and a time slot where the reconfiguration of precoding weights occurs.

8. The network node of claim 1, the processing circuitry is further configured to cause transmission of signaling indicating a time period during which at least one of a phase shift and time shift of a signal discontinuity will occur.

9. The network node of claim 1, wherein the indication of transmission property information provides an indication of a time period during which one of a coherency of a transmitted waveform will be broken and coherency of a transmitted waveform is expected to be unstable.

10. The network node of claim 1, wherein the indication of transmission property information provides an indication of a time period during which coherency of a transmitted waveform is expected to be stable.

11. The network node of claim 9, wherein the processing circuitry is further configured to provide a criteria for defining a stable signal before providing the indication of transmission property information.

12. The network node of claim 1, wherein the reconfiguration of precoding weights creates a phase and amplitude discontinuity in a transmitted signal.

13. A method implemented in a network node that is configured to operate in a cellular non-terrestrial network, the method comprising:
providing an indication of transmission property information associated with a reconfiguration of precoding weights, the indication of transmission property information providing information associated with decoding one of a physical downlink shared channel and a physical downlink control channel (PDCCH), the transmission property information including information concerning a capability of the network node to provide a stable and coherent transmission waveform based at least in part on whether a measured power gain of combined IQ samples over a sequence of repeated radio blocks relative to a power of a first radio block of the repeated radio blocks exceeds a threshold.

* * * * *